March 9, 1948.  W. H. SETZ  2,437,619
EMERGENCY PICK-UP EQUIPMENT
Filed May 24, 1944  7 Sheets-Sheet 1

Fig. 1.

Witnesse
Sarah Street
Ann H. Backus

Inventor
Walter H. Setz
by
Attorneys

March 9, 1948.　　　　W. H. SETZ　　　　2,437,619
EMERGENCY PICK-UP EQUIPMENT
Filed May 24, 1944　　　　7 Sheets-Sheet 2

Witnesses:
Sarah Street
Ann H. Backus

Inventor
Walter H Setz
by Steel Jackson and Son
Attorneys

March 9, 1948.   W. H. SETZ   2,437,619
EMERGENCY PICK-UP EQUIPMENT
Filed May 24, 1944   7 Sheets-Sheet 7

Witnesses:
Sarah Stuart
Ann H. Backus

Inventor
Walter H. Setz
by Steell Jackson and Son
Attorneys

Patented Mar. 9, 1948

2,437,619

UNITED STATES PATENT OFFICE 2,437,619

EMERGENCY PICKUP EQUIPMENT

Walter Hans Setz, Upper Darby, Pa., assignor to All American Aviation, Inc., Wilmington, Del., a corporation of Delaware Application May 24, 1944, Serial No. 537,061

8 Claims. (Cl. 258—1.2)

My invention relates to emergency pick-up equipment for airplanes, whereby an airplane which was not intended for pick-up duty at any time may be equipped for it with great speed and effectiveness.

The main purpose of the invention is to simplify the equipment of airplanes with pick-up mechanism.

A further purpose is to mount pick-up mechanism for use by airplanes upon bases especially suited to emergency installation and use.

A further purpose is to provide emergency pick-up equipment for airplanes, whereby with ground stations erected at the scene of a pick-up, injured persons may be picked up and transported to hospitals or other places for treatment.

A further purpose is to supply unit pick-up sets for airplanes, ready for almost instant installation within any of a great variety of airplanes and suiting these airplanes for duty at present otherwise requiring permanent construction. The installation of this special equipment is expensive and requires excessive time during which the airplane is withdrawn from service.

A further purpose is to provide three point mounting for a pick-up unit intended for insertion in an airplane.

A further purpose is to supply unit airplane pick-up equipment upon bases ready for quick temporary mounting upon or within airplane structure; whereby the units can be kept stored in airplanes for emergency use or at depots so that in emergency any of a considerable variety of airplanes can be impressed for pick-up duty. The combined structure is quickly assembled or disassembled and is used with ground "stations" which have been dropped from an airplane at the location where emergency service is to be rendered.

A further purpose is speedily to rescue persons in distress such as wounded soldiers, shipwrecked persons, and injured servicemen, etc. behind the enemy lines.

Further purposes will appear in the specification and in the claims.

My invention relates not only to mechanism, but to the methods involved.

I have preferred to illustrate my invention not by one intended use only, but by several different structures, selecting a use which is the main use both because of the importance of saving life and because of the difficulties ordinarily involved in serving such special emergency pick-up needs.

Figure 4 is a perspective of one form of the removable and replaceable unit ready for mounting in an airplane.

Figures 4ª, 4ᵇ and 4ᶜ are fragmentary perspective views showing a modification.

Figure 7 is a fragmentary section of the retaining device for an operating lever seen in Figure 6.

Figure 8 is a side elevation of one of two retaining plates holding the lever in Figure 7.

Figure 9 is a fragmentary side elevation of the structure of Figure 6.

In the drawings similar numerals indicate like parts.

There are emergencies when it is very highly desirable to be able to make "pick-ups" from airplanes of objects or persons such as injured soldiers, fighters and intelligence men behind the lines, etc., on the ground and airmen, sailors and others adrift in the sea, to be picked up and removed from one location to another as, for example, where an injured person is to be removed from a place where he cannot be treated to a field or base hospital or is to be removed from a field hospital to a base hospital.

Obviously there can be no control as to the particular place where the man is injured and very little control as to the surroundings and local conditions under which the pick-up must be made.

Airplanes have been specially equipped for the purpose of picking up objects of many different types, including mail, packages and even gliders and airplanes. These aircraft require special mounting of that portion of the pick-up unit carried by the aircraft, hereinafter referred to as airplane, and the special installation within the airplane requires a great deal of time.

Under normal circumstances the equipment of such a plane for pick-up purpose requires weeks of work, making it wholly impracticable to equip an airplane for the purpose after an emergency has arisen and in time to take care of the emergency.

Special equipment is required also locally at the point of pick-up, but the provision of such local equipment would not present difficulty of the same character.

Notwithstanding the large numbers of persons who require emergency treatment and the wide variety of causes for such need of treatment, which have been present ever since the beginning of the war, there has been so far as the inventor knows no previous suggestion as to a means for taking care of this emergency.

Applicant has provided an emergency unit mounted so as to be capable of being introduced into and temporarily fastened within an airplane in a few minutes, providing the drum, brakes, power equipment and everything else required within the airplane, to be used with a pick-up arm either forming part of the unit or capable of quick temporary attachment to the airplane.

With units of this character distributed at key points throughout an area to be protected, any airplanes of the types for which the unit is fitted can be equipped in a few minutes as pick-up airplanes and will be fully serviceable to perform the emergency service referred to. When word has been received of the need of such emergency service, a pick-up unit can be installed immediately and the ground equipment for the service can be dropped from an airplane to the position where the pick-up is to be made and can be installed within a few minutes for co-operation with the airplane in the intended pick-up.

Depending only upon the extent of distribution, the time required to prepare for and effect the emergency pick-up of a person can thus be reduced to the few minutes required for installation, plus the time required for any airplane in which the unit is installed to fly from the point at which the units are stored to the point of pick-up.

Where an airplane has been specially fitted with a permanent installation of the character needed for pick-up, the pick-up installation occupies a position in the airplane such as to interfere with the use of the airplane for other purposes. For this reason permanent installations of the character cannot be supplied to a large number of airplanes upon the chance that one of them will be available for emergency service because the airplanes then cease to function properly for the other intended airplane purposes.

These same airplanes which cannot carry permanent installations in place, can carry units in "storage" at some other point on the airplane, where they will not be in the way; and cargo airplanes can carry the units ready for installation. If not suited to accomplish the pick-up themselves these airplanes can be flown to meet an airplane capable of pick-up use so that the unit carried by the cargo airplane can be installed almost immediately in the airplane which is to perform the pick-up function.

For the above reasons and to secure the above functions it is the intention to describe a plurality of units capable of being attached in different positions to airplanes of slightly different character. The purpose is to supply equipments which are suited each for mounting in any one of different positions or in any one of different airplanes so as to have maximum adaptability.

The equipment described is intended to be capable of use with depending pick-up poles, attached as parts of the unit or with separately airplane-attached pick-up poles as may be convenient, the part of the equipment which is specially helpful being the power, drum and brake mechanism.

Figure 1:
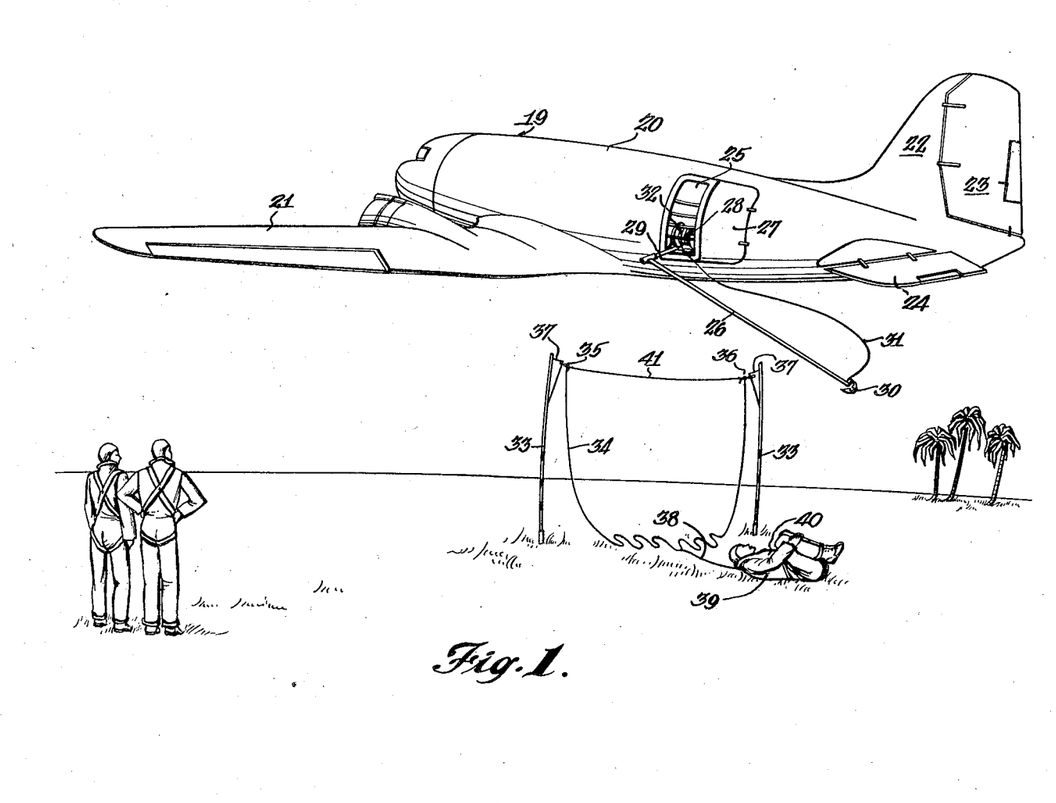
Figure 1 is a perspective view showing an airplane and pick-up equipment in the act of picking up an ill or wounded man from the ground.

In Figure 1 the airplane 19 is intended to be typical of airplanes which may be used for the purpose. It comprises the body 20 of the airplane, wings 21, vertical fins 22, suitable rudder 23 and elevators 24. The propeller power plant, etc., are not shown.

Whatever the form of airplane it must have a suitable entrance 25 by which cargo, for example, can be inserted and through which the present unit is inserted. There must also be an opening—which may be the same opening—through which the pick-up arm 26 may be supported and controlled.

In the present instance the plane 19 is shown as having a side entrance 25 controlled by a door 27, which can be opened wide enough to allow the entire unit 28 to be inserted from the side as well as permitting the support 29 to project at the side so as to hold and to manipulate the pick-up arm.

In the present illustration the pick-up arm is in one piece and at its lower end removably carries a hook 30 attached to cable 31. The hook is pulled free from the arm when a pick-up is effected. The cable is wound upon a drum 32.

In connection with the airplane and its pick-up unit there is used locally ground station equipment comprising poles 33 and loop 34 connected with the tops of the poles by removable pressure-opened contacts 35, 36. The loop is made preferably of nylon which will have a considerable yield with ultimate but not immediate recovery. Flags 37 connect the loop to the poles.

The middle of the loop is connected by a cord 38 with a suitable device at 39 within which or by which someone to be rescued, such as an injured man, 40, is carried. The device shown is a parachute harness but it is the intention to use any suitable sling or basket or other container by which a person may be carried.

When the stretch 41 is engaged by the hook the loop is detached by strain from the supporting poles, and the nylon or other material of the loop yields to the strain of the pick-up, reducing the jar upon the one to be rescued.

At the same time the hook is released from the pick-up arm and the cable starts to pay out from the pick-up drum. Whatever shock occurs during the towing is relieved by yield within the cable.

When the drum has reached the intended limit of comparatively free pay-out a brake is applied progressively, by reason of which the rate of pay-out is first reduced and the paying out is later stopped and subsequently the cable which has been payed out may be drawn in by a power system which forms part of the unit.

The detail of the pick-up mechanism, the release of the hook from the pick-up arm, the manner of securing suitable stretch in the pick-up loop as a part of the ground equipment and the detail by which the drum is allowed to pay out with comparative freedom at first and subsequently is progressively braked to reduce the jar upon the man picked up have all been described and are being claimed in other applications. It is not the intention to claim the particular arrangements of these parts in the present case, the novelty herein being directed to the provision of a unit which may be inserted temporarily and very quickly within an airplane for performing functions which are old and which already are being carried out in standard airplane equipment by structure which has been built into the airplane and made a part of it.

It is the intention to apply the present invention through units which are specially suited for rapid temporary mounting in order to secure maximum speed and efficiency in transformation of the airplanes. I make it possible to fasten the units to floors, sides or ceiling of the airplane, or to special construction such as to a bomb rail or upon the support to which a bomb rail is normally fastened.

Figures 4, 4A, 4B, 4C, 7, 8, 9:
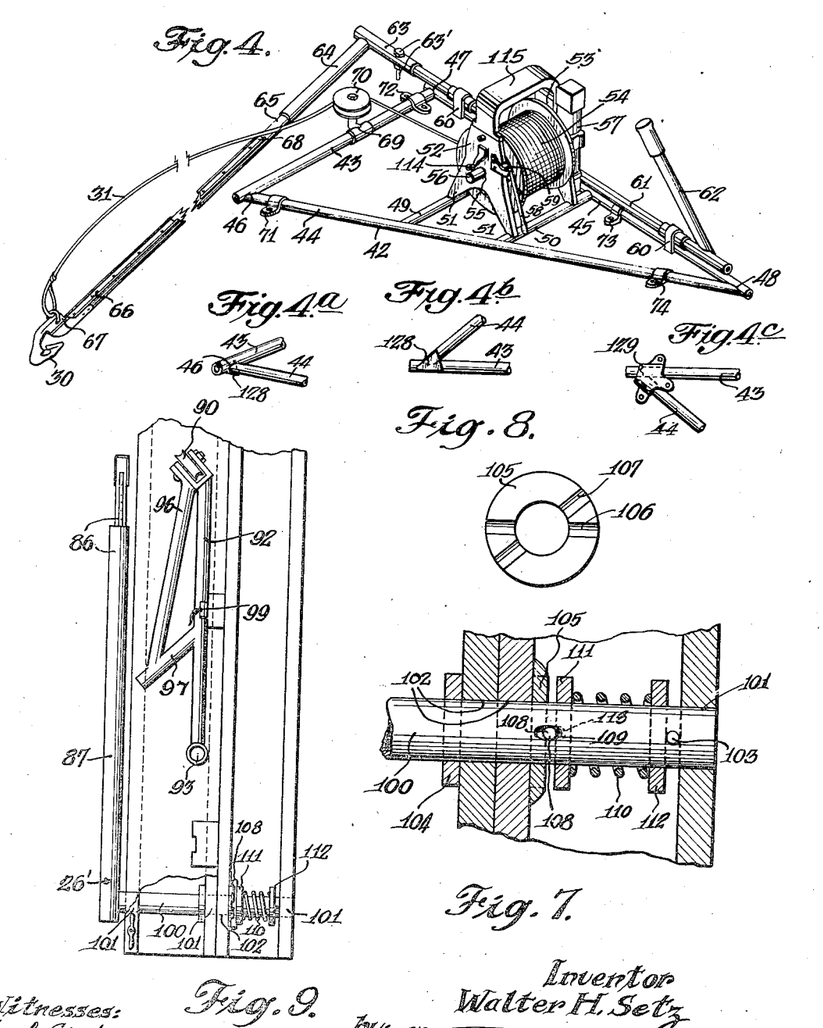

A preferred form uses a triangular base 42 such as that shown in Figure 4, which is made triangular because stresses are there transmitted to the best advantage to the sides of the triangle adjacent the side upon which the stress is first applied and without danger of collapse.

The triangle is built up preferably of "tubes" for sides 43, 44 and 45, welded together at 46, 47 and 48. In order to support the drum and its associated parts and to further stiffen the base, parallel (again preferably tubular) bars 49 and 50 are welded to adjacent base sides, across from one side to the other, upon which bars the feet 51 of double yoke drum supports 52 and 53 are secured.

The yokes support drum 54 in bearings 55 and the cable 31 is wound upon or allowed to pay out from the drum. An electric motor or power plant 57 is connected so that it can be applied to the drum at will. It is mounted upon the same unit base as is the drum. Any suitable plug and socket or other connection is made between the motor and an electric circuit upon the airplane.

A brake 58 is shown which is pivoted at 59 and is hand-applied to the drum. It may be made to perform normal brake functions. As a matter of fact the brakes for existing pick-up drums are internal, are pre-set, automatically to be applied.

Strips 60 are attached to one of the sides, such as side 45 so as to form bearings for a rocker shaft 61, operated by a hand lever 62. At one end the rocker shaft carries a sleeve 63 removably attached to the rocker shaft by a pin or bolt 63'. The sleeve 63 is rigidly attached to a sleeve 64 within which is secured a pick-up arm 65. The pick-up arm 65 in the form shown, carries a track 66 upon which is mounted a slide 67 for a hook 30. The slide may be mounted upon the track 66 at the upper end 68 of the track so as to coast downwardly to the lower end of the track as shown in Figure 4, and the hook can be withdrawn from the lower end of the slide by tension. The mechanism by which the hook is retained upon the track until it is removed by tension during the pick-up operation is not shown nor claimed herein, but forms the basis of other applications.

The bracket 69 is mounted upon one of the sides, such as side 43 of the triangle base and carries a pulley 70 which can be turned about the arm by turning the bracket. The pulley guides the cable between the drum and the hook, both before and after the hook leaves the arm.

The cable may be let out from or be reeled upon the drum. No effort has been made to show the details of various refinements normally used on existing pick-up equipments.

In assemblage, the unit is rested against the bottom or the sides or the ceiling or any other selected suitable part to which the unit is temporarily attached by means of clamps, such as those seen at 71, 72, 73, 74, using screws or other fastenings, the only operation required being that of securing these clamps in place and the application of electric current to the motor.

Let us assume that the poles, loop and other "ground" equipment have been dropped at the scene of the proposed rescue and have been erected, and that all is ready there.

As the airplane approaches the transverse stretched loop, the pick-up arm carried by the airplane is in position to engage and pick up the loop. The hook pulls the loop free and at the same time takes up the slack.

The stress due to engagement with the loop and the pull required to separate the stretch from its fastenings withdraws the hook from the end of the depending pick-up arm or pole and the load, through the hook, begins pulling directly upon the cable, starting rotation of the drum. While the slack at 38 and the yield due to the elongation of the nylon or other material of the loop are helping to ease the start, the pull upon the cable stretches the cable and begins to rotate the drum.

The intended "free" release of cable takes place to a predetermined extent and the brake is set progressively to slow and ultimately to stop the rotation of the drum.

The speed of travel of the basket containing the one in distress is thus increased until it corresponds with that of the airplane, after which application of power to the drum causes the cable to be wound upon the drum pulling the basket to a point where the occupant can be lifted into the airplane.

The mechanism for accomplishing these several steps in "launching" the occupant with minimum jar upon him and with the greatest safety involves progressive use of the brake.

There is a special benefit to be gained from the use of a triangular base, emphasizing the form of Figure 4 and the three point suspension of Figures 4a, 4b and 4c, in that with any special strain upon any one of the sides of the triangle the other two sides give immediate support against a change of shape of the triangle, resulting in a particularly stiff, self-contained structure as distinguished from a structure in which four or more sides may tend to collapse when special strain is brought upon the support in diagonal directions.

In Figures 5, 6, 7, 8 and 9, a unit is shown as made up of channels 75, 76 but which may be made of angles, Z-bars or other shapes, having each one or more flanges 77. The shapes are united transversely by plates or transverse stiffeners 78, 79, 80 and 81. The flanges of the members are preferably parallel and two of them afford support for the feet 51 of the yokes 82, 83 by which the drum 84 is supported between the two shapes. The same type of drum is intended to be shown, to which and from which the cable 31 passes.

The same brake and driving mechanism may be used as in Figures 1–4. Transmission gear 85 is illustrated and the brake may be located within the end of the drum, in that event preferably adjacent the transmission gear.

Figure 5:
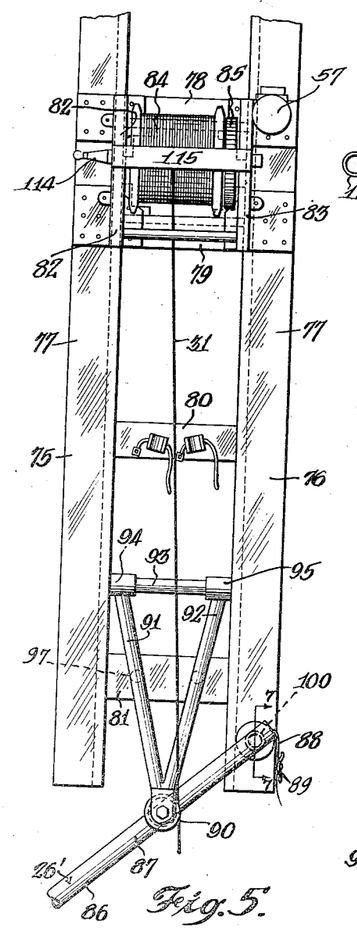
Figure 5 is a front elevation of a removable unit in position where it is attached to a bomb rail.
Figure 6:
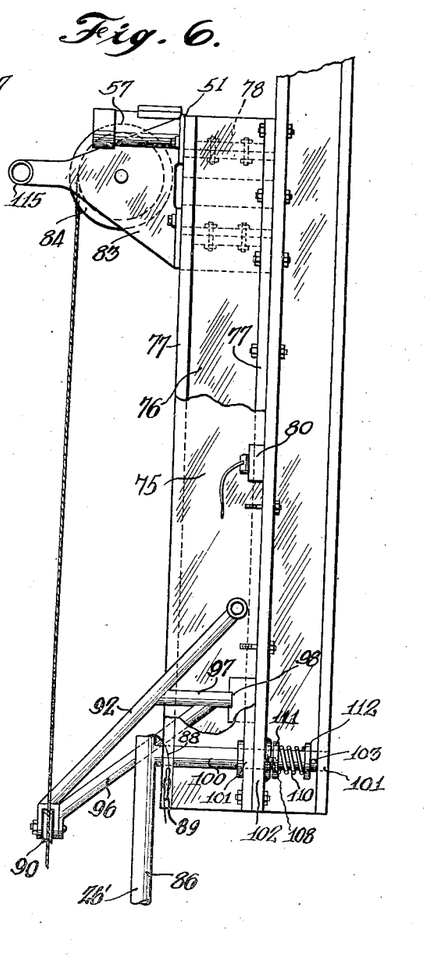
Figure 6 is a side elevation of the structure shown in Figure 5 attached to the vertical strips forming or adapted to form a bomb rail mount.

A telescopic depending pick-up arm 86 may be used of which the upper and larger telescopic member is shown at 87. The telescopic members drop to extended positions and suitable stops prevent them from becoming disconnected.

A cord 88 may be used to pass down through the upper and larger telescopic member to the smaller or the smallest of the telescopic members so that the cord may be pulled up to telescope the members one or more within another or others. The cord is fastened to a cleat 89 at the limit of extension of the telescopic members, at any intermediate positions at which they are to be held, including the position at which the telescopic members are at their highest points, i. e. when the combined telescopic members are telescoped to their maximum extent.

The lower end of the innermost telescopic section carries the hook which is mounted so that it can be withdrawn by a pull upon the hook.

Since the telescopic members can be collapsed upwardly to render the lower end of the telescopic arm accessible, the hook 30 can be applied while the parts are telescoped upwardly and the telescopic members may then be allowed to extend to their lower limits as the cord is slacked. The hook is intended to be removable by tension from the lower end of the arm as in the form of Figures 1–4.

In Figures 5 and 6 the metal shapes 75 and 76 are intended to be shown as applied to vertical walls in an airplane, such, for example, as the vertical walls of a bomb bay in the absence of the bombs, using vertical structure, permissibly side walls, for a mount in which the base of the unit is vertical.

In some airplanes it is more convenient to mount the unit against vertical walls, side, end or partition, either because of the interior construction of the airplane itself, giving better support or better access to vertical walls or because of the fact that the opening into the airplane through which the unit must be introduced is more conveniently located for vertical attachment of the base of the unit or for connection of the depending pick-up arm to or from a vertical base unit. The unit will then be clamped against the vertical wall of the airplane, whether this wall be parallel to the airplane length, transverse to this length or diagonal. Another example appears in Figure 12.

If the shapes be mounted on bomb rails, a very convenient form where a bomber is used, the stiffeners shown in Figure 5 may be quite helpful. The parts are preferably bolted together, not only so that they can be put together with a minimum of time but so that subsequently they can be detached without injury to any of the structure.

In the form shown in Figures 5 and 6 a pulley guide serving the function of pulley 70 is shown at 90. It can be folded out of the way in the unit or can be extended to act to the best advantage as a guide. The pulley 90 is shown as mounted upon coverging arms 91, 92 rigidly connected at the pulley.

At the end opposite the pulley the preferably tubular arms 91, 92 are rigidly attached to a shaft 93 journaled at 94 and 95 in the shapes used. A brace 96 and stub (foot) 97 rigidly attached with respect to the arms, swing with the arms counterclockwise from the extended (operative) position seen in Figure 6 to the "storage position" seen in Figure 9. In Figure 6 the stub (foot) 97 receives the stress of use and transmits it to a block or pier 98 upon one of the flanges. In Figure 9 the arms 91, 92 of the inactive pulley support are held by straps 99.

The depending pick-up arm, rod or pole 26' is attached to swing with a transverse pivoting hollow shaft 100 mounted in bearings 101, 102. For latch purposes this hollow shaft is provided with a pin 103 and a ring 104, both being attached against longitudinal movement with respect to the shaft. The ring may be welded or pinned to the shaft.

Ring 105 is prevented from rotation with respect to the adjacent flange and may well be welded to the adjacent metal. Ring 105 is grooved in two angular positions at 106 and 107 corresponding to the positions assumed by a pin 108 through the shaft when the pick-up arm or pole is raised and when the pick-up arm or pole is lowered to its intended pick-up use.

The pin 108 is seated in a slot 109 slightly longer axially of the shaft than the diameter of the pin so that slight play longitudinally of the shaft may be allowed. It is pressed toward the depending arm 26' by a spring assemblage comprising spring 110 and two washers 111 and 112. The washer 112 rests against pin 103 as an abutment and the compression spring resting against it pushes washer 111 to the left in Figure 7. Because the ring 104 is rigidly attached to the shaft the pin 108 is pressed to the left in Figure 7 tending to seat it within one of the grooves 106 or 107, tending to press the pin tranversely into groove 106 at one end of the angular stroke of the arm or into groove 107 at the other end of the angular stroke. Though it makes little difference in the result, the washer 111 is grooved at 113 to receive the right hand side of pin 108.

In operation the shaft 100 is rocked by pulling on the arm, and latches in the raised and lowered positions respectively when pin 108 fits into groove 106 or 107. It will be evident that the latch mechanism shown in Figures 7, 8 and 9 forms a convenient and effective way of limiting the movement of the pick-up arm and of latching it in its two extreme positions.

The lever 114 appearing in Figure 5 is a presetting brake lever for a brake concealed within the drum. The brake is preset in order to provide a certain number of subsequent turns of the drum.

It will be evident that the parallel rail or bar type of base for my unit forms a second type of support for the unit, quickly capable of being temporarily mounted in airplanes, having special suitability for mounting upon vertically extending flanges within an airplane.

In the various figures the drum supporting yoke ends are spaced and stiffened by a bar which in Figures 5 and 6 is numbered 115.

Figure 10:
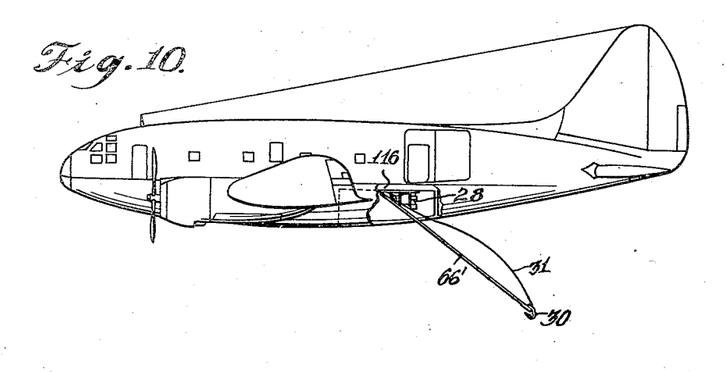
Figure 10 is a side elevation, partly broken away, of a different type of airplane than that of Figures 1, 2 and 3.
Figure 11:
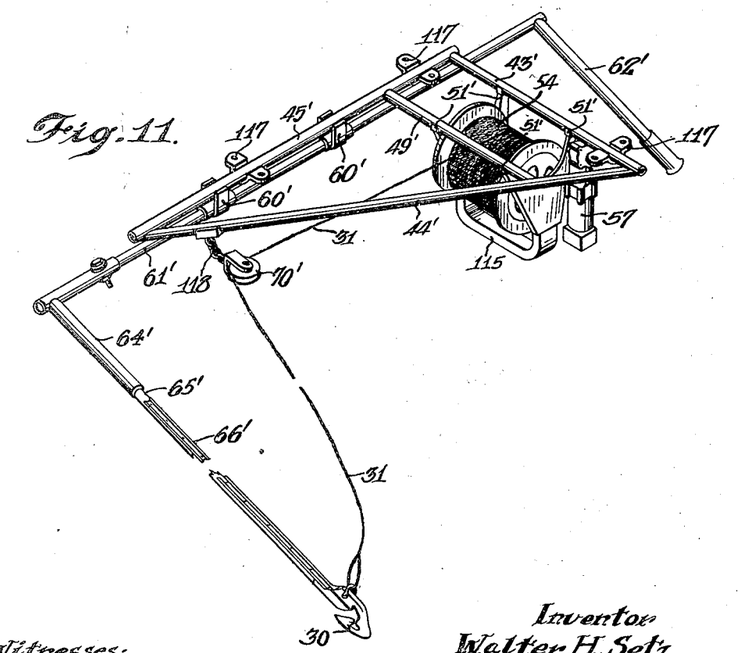
Figure 11 is a perspective view of a unit ready for installation in the structure of Figure 10.

In Figure 10 a unit is installed which may be of the character of that shown in Figure 4 or of that shown in Figure 11, for example. If the Figure 4 unit be selected it must be adjusted to right-side-left form and turned upside down.

In Figure 10 the airplane is of Commando type, having its interior divided into two floors or stories by a horizontal partition or floor 116. A unit of the type seen in Figure 11 is hung from the ceiling of the lower floor and the depending pick-up arm extends from the side of the airplane.

In all of the airplanes it is the intention that the unit shall be capable of insertion through whatever opening is available in the type of the airplane involved, whether the opening be a side opening as in Figures 1–3 and Figure 10 or a bottom or a top opening, and that the support for the pick-up arm shall project from the side or bottom as may be required by the construction of the airplane. In seaplanes the pick-up arm will ordinarily extend through a bottom opening.

The base or foundation in Figure 11 is triangular and is built up from tubular stock. It is intended for attachment from below and the clamps 117 by which it is held in place are, of course, reversed as compared with those in Figure 4, to clamp it upwardly instead of downwardly. As in the case of the structure of Figure 4, it is capable of being fastened to a floor, to vertical strips or to a vertical surface or to the under surface of a ceiling.

Instead of the cross pieces 49, 50 connecting sides 44' and 45' at an intermediate point in the length of the triangular base, a single cross piece 49' is located near enough to the end 43' for the end and this cross piece together to form the pair of approximately parallel supports to which are attached the feet 51' of the yoke terminals.

The rocker shaft 61' is rocked by lever 62' to swing sleeve 64' about the axis of the rocker shaft, lifting or lowering the pick-up arm 65'. Here again the sleeve is removably attached to the rocker shaft by a bolt. The hook is applied at the top of a track 66' and may slide down the track, to the lower end. It is removably mounted upon the track so that the jar or shock attendant upon picking up the stretch of the nylon loop or the subsequent strain upon it attendant upon pulling out the cable, withdraws the hook from the end of the arm.

The cable passes over a pulley 78' which guides it from the drum to the hook in whatever direction of tension the hook may be drawn. The pulley is connected with one of the frame sides by chain 118. The rocker shaft is supported in strips 60'.

Figure 2:
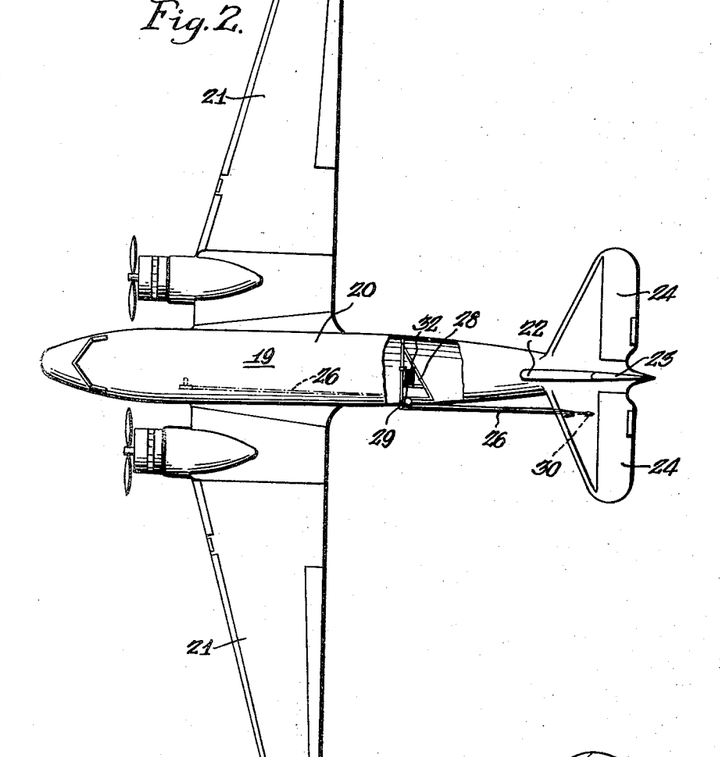
Figure 2 is a top plan view of the airplane in Figure 1.
Figure 3:
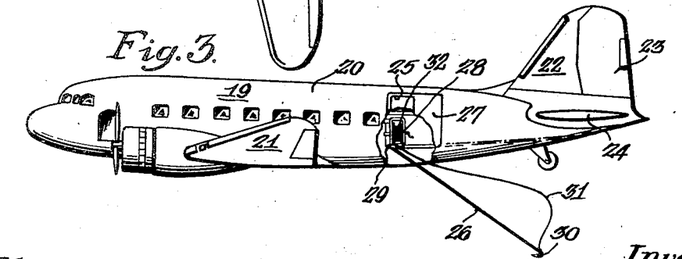
Figure 3 is a side elevation of the airplane broken away in part and showing the location of the pick-up mechanism.
Figure 12:
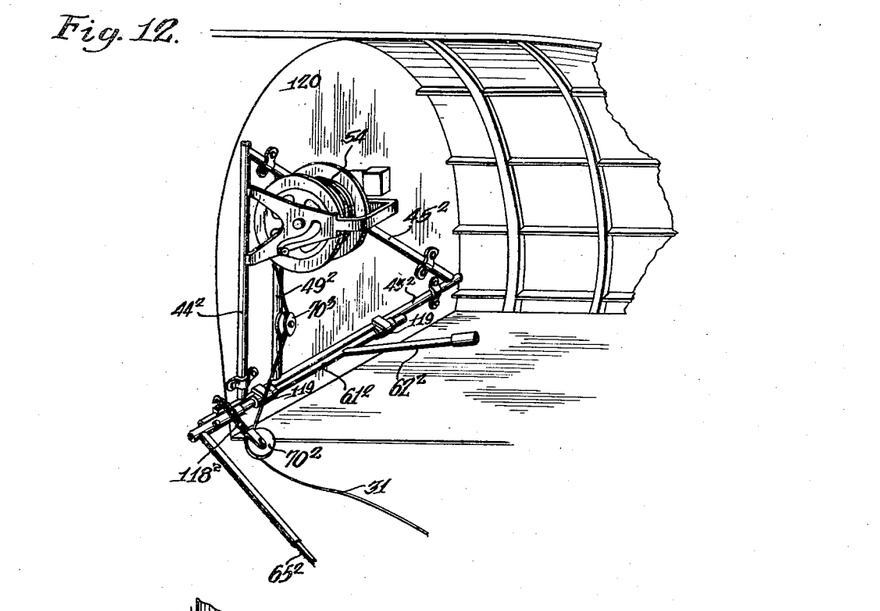
Figure 12 is a unit of one of the types shown herein, mounted upon the bulkhead of a special airplane.
Figure 13:
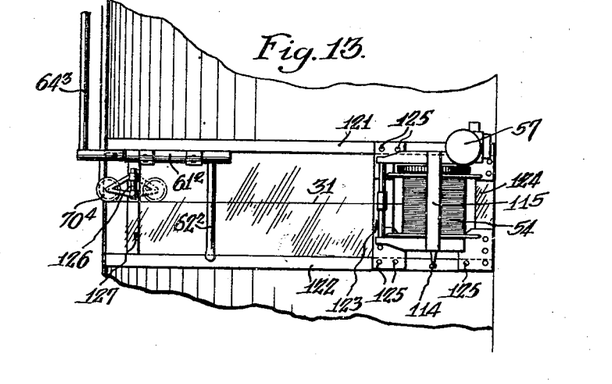
Figure 13 is a side elevation of a unit extending across the body of an airplane and mounted upon beams.
Figure 14:
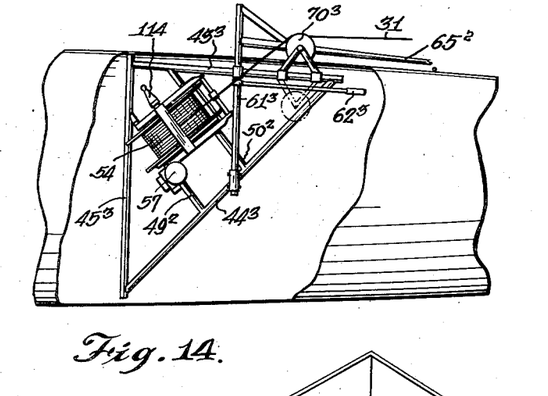
Figure 14 is a perspective view of a unit mounted in position within an airplane, the ceiling or roof of the airplane having been removed for this view.
Figure 15:
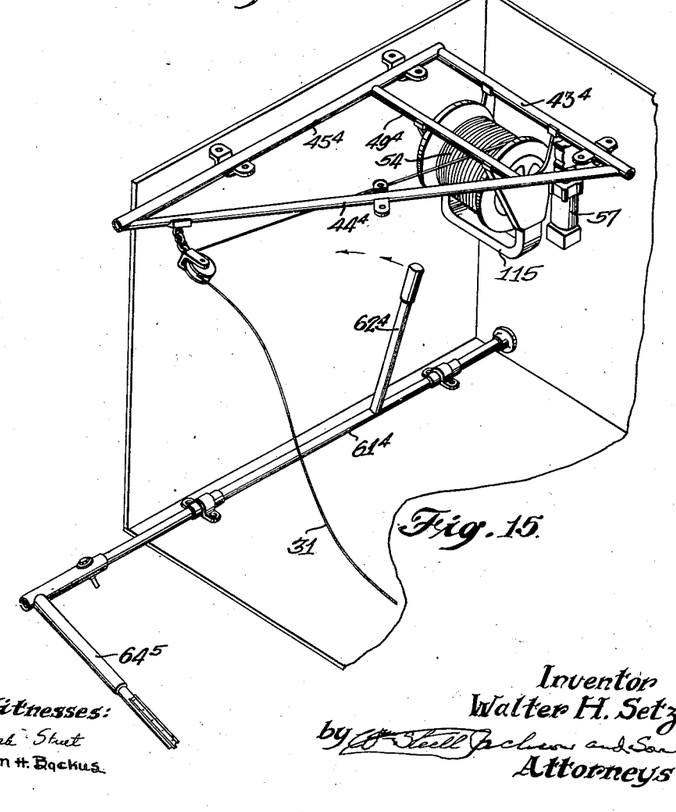
Figure 15 is a perspective showing a pick-up arm and drum unit separately mounted.

It will thus be seen that the frame of whatever character, but preferably tubular and triangular, can be mounted upon the floor as in Figures 1–3, or upon a vertical wall as on the supporting structure for a bomb rack in Figures 5–9, or depending from a ceiling as in Figures 10–11, upon a bulkhead in Figure 12 or across the body of a plane on beams as in Figure 13; and that though the pick-up arm and its support may be carried directly by the unit which is being installed, as a unit, as appears in the first twelve views, and Figure 14, the drum, brake, power and control mechanism may be mounted as one unit and the pick-up arm with its supporting mechanism can be mounted separately as seen in Figures 13 and 15.

In Figure 12 the triangle is an equilateral triangle having sides $43^2$, $44^2$, $45^2$ of airplane tubing and welded as before, to one of which sides bearings 119 hold a rocker shaft $61^2$ of the same general character as used in Figures 4 and 11. The rocker shaft is swung between effective and ineffective positions by an arm $62^2$. As in the other figures the electric motor is a part of the unit.

In the illustration shown the base is cleated directly to an airplane part, in this case to a bulkhead 120.

In Figure 13 the drum, motor, brake and control mechanism are mounted on transverse beams 121, 122 extending across the airplane, held together as a unit by the yoke ends and transverse bar. The rock shaft carrying the pick-up arm, along with the bearings for the rock shaft are separately temporarily installed in a different position.

The drum with its drum flanges, the gear connected with it, the motor and the drum yokes, with their connecting strap across the top are seen at the right hand and are mounted upon transverse connections 123, 124, fastened at 125 completing the base of the emergency unit and extending across for temporary attachment to the beams in the figure.

The cable 31 extends from the drum about a sheave $78^4$ carried by a swinging bracket 126. The cable passes to the hook at the lower end—not shown—of the depending sleeve $64^3$. The bracket folds back to the dotted position seen in Figure 13. The bracket is supported upon a strip 127.

In Figure 14 the tubular triangular base is of isosceles type and is stiffened by parallel bars $49^2$, $50^2$ which are not parallel to any of the sides and which therefore unite the same side with respectively different other sides. They afford excellent stiffening to the self-contained unit and are further stiffened by rigidly fastening to them the yoke feet 51, two to one of these bars and two to the other of the bars. The rocker arm $61^3$ is mounted in bearings connecting with the base so as to support and swing the pick-up arm $65^2$. The cable guidance is by a swinging bracket and pulley carried by it. Connection with an airplane ceiling or roof may be made by cleats.

In Figure 15 the construction of the triangle and the relations of the parts of the triangle correspond generally with those in Figure 11 but the rocker shaft for the pick-up arm is separately mounted being disposed at some distance from the drum unit. The support for the guiding pulley also is that of Figure 11 and the unit is shown as adapted to be installed beneath a horizontal surface.

In Figures 4ᵃ, 4ᵇ, and 4ᶜ the base is adapted to be used with three-point contact with its mount.

The three-point contact may be secured in various ways but is secured most conveniently by forming a contact projection 128 at each of the joints of the sides of the triangle, the projections being, of course, all on the same side of the completed base, namely the side making the contact with the supporting wall of the airplane. These projections 128 may be supplied by welding and in the positions indicated will support the unit at the ends of the respective sides of the triangle. Depending upon the rigidity of the tubular sides, the cleats or other temporary fastenings for the base may be located along the lengths of the sides wherever conveniently they can be applied to structural members of the airplane.

I have shown a clip 129 conforming to the surfaces of the base at the corners and by which the three-point contact base can be supported to the greatest advantage, the fastenings being located inside the angle and outside the tubular sides at the corners.

The three-point support given supplements the advantages of the triangular base, using to the full its self-contained features.

A variety of forms and placements of the triangular base—and therefore of the self-contained unit—has been shown in order to emphasize that though any self-contained base and pick-up unit is beneficial, the triangular base has special merit on account of its greater rigidity for the weight and space involved and that the triangular base is advantageous whether the sides of the triangle be unequal as seen in Figures 4, 11 and 15 or the triangle be an isosceles triangle as in Figure 14, where only two sides are equal, or all three sides be equal in the equilateral triangle of Figure 12.

It will be evident that my invention is suitable for all sorts of airplanes whether they be passenger or cargo, even to use with such special duty planes as bombing planes, in each case being capable of temporary mounting and of subsequent removal and storage so that the airplane may resume its former duty; and that this invention tremendously enlarges the number of airplanes which become available for rescue service.

It will be evident that the present invention is suitable for use not only with the full length and telescopic pick-up arms which have been illustrated but with whatever other forms of pick-up arm may be desired, since the character of the means by which the hook can be placed at the bottom of the arm is not of the essence of the invention.

It will be evident that because of the self-contained character of the unit, each of the temporary fastenings relatively re-enforces or helps to hold all of the others since the unit would operate fully and freely if it could be secured to the airplane by a single fastening only.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In an emergency air pick-up system, an airplane, a rigid triangular base removably attached to said airplane, a double yoke mount for a drum, stiffening means for the triangular base upon which the yoke is rigidly mounted and by which yoke the base is further stiffened, a drum rotatable within the yoke, a motor for operating the drum, a brake for the drum, a pick-up arm removably attached to said airplane, a hook carried by the arm and removable from it by pull upon the hook, and a cable connected with the hook and wound upon the drum.

2. In an emergency air pick-up system, a unit detachably mounted in an aircraft, a triangular base comprising tubular side members rigidly connected together at their ends, tubular reinforcement for the base, said reinforcement including parallel tubular bars providing a drum support, a mount for a drum rigidly connected to the tubular support, a drum adapted to rotate on the mount, a motor for operating the drum, a brake for the drum and means for attachment of the unit to an airplane.

3. In a pick-up unit for temporary use with airplanes, a triangular base comprising tubular sides rigidly united at the ends of the sides, a tubular stiffening brace united to two of the sides, and parallel with the third side, a yoke support for a drum having yoke feet united to the stiffening member and to the third side and additionally stiffening the base, a drum carried by and adapted to coast within the drum support, a brake for the drum, driving means for the drum, a pick-up arm mounted upon the base, a cable carried by the drum and mounting means for securing the unit in an airplane.

4. In pick-up apparatus, an aircraft, an emergency unit for use in conversion of an existing airplane lacking pick-up equipment into an airplane capable of picking up objects, and comprising a flat triangular base frame having a pair of substantially parallel reinforcing bars rigid with the base, a yoke-supported drum upon the bars, a brake carried by the drum, a cable upon the drum, the drum being adapted to run comparatively free when the brake is not applied and to have the extent of retardation to the paying out of the drum varied by the extent of braking, a pulley attached to said frame for guiding the cable, a motor adapted to reel in the cable payed out from the drum, an offset pick-up arm detachably carried by said aircraft, a hook upon the pick-up arm with which hook the cable is connected, the hook being adapted to be released from the arm by pull upon the hook, and means for temporarily mounting the unit upon aircraft.

5. In an air pick-up system, an aircraft having bomb rack vertical supports, a self-contained pay-out unit comprising a base, a drum, a brake for the drum, a motor for operating the drum, the unit being removably mounted upon the vertical supports, a cable upon the drum, a pulley bracket carried by said base and adapted to swing from cable supporting position to storage position, a strut supporting and stiffening the bracket when in cable supporting position, a pulley carried by the bracket, a pick-up arm on said aircraft adjacent the bracket, and a hook removably secured at the lower end of the pick-up arm and to which the cable is guided by the pulley.

6. In an emergency air pick-up system for use on an airplane, a rigid base, a double yoke mount for a drum, a drum rotatable within the yoke, stiffening means for the base upon which the yoke is mounted and by which the base is further stiffened, a motor mounted on the yoke, a brake for the drum, a pick-up arm removably attached to said base, a hook carried by the arm and removable from it by pull upon the hook, and a line connected with the hook and wound upon the drum.

7. In emergency air pick-up apparatus, an aircraft, a base formed from tubular members secured together having each side united rigidly at its ends, means for removably anchoring said base in said aircraft, means for bracing said sides including a stiffening member, a winch frame having a drum and carried by said base, a brake concealed within said drum, a motor mounted on said base adjacent said drum, and a pick-up arm detachably secured to said base.

8. In emergency air pick-up apparatus, an aircraft, a base formed from tubular members secured together having each side united rigidly at its ends, means for removably anchoring said base in said aircraft, means for bracing said base including a stiffening member, a winch frame having a drum and carried by said base, a brake concealed within said drum, a motor mounted on said base adjacent said drum, and a pick-up arm pivotally and releasably secured to said base.

WALTER HANS SETZ.

REFERENCES CITED

The following references are of record in the file of this patent:

UNITED STATES PATENTS

| Number | Name | Date |
|---|---|---|
| 1,602,851 | Holt | Oct. 12, 1926 |
| 1,873,822 | Castro | Aug. 23, 1932 |
| 1,929,488 | Fullhart | Oct. 10, 1933 |
| 2,014,557 | Clampitt | Sept. 17, 1935 |
| 2,373,413 | Plummer | Apr. 10, 1945 |
| 2,373,414 | Plummer | Apr. 10, 1945 |

OTHER REFERENCES

Scientific Am., April 1944; page 175.
Air Pick-up Bull. of All American Aviation Inc.